July 25, 1950 S. C. FRENCH ET AL 2,516,459
TRAILER HITCH
Filed Aug. 25, 1947
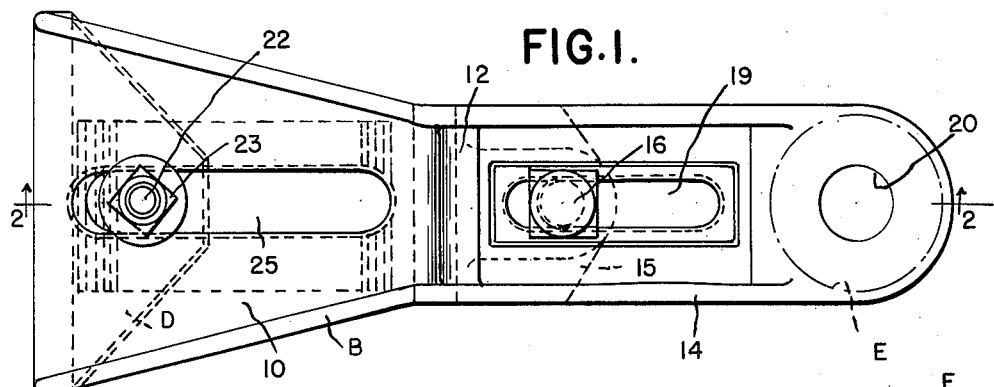
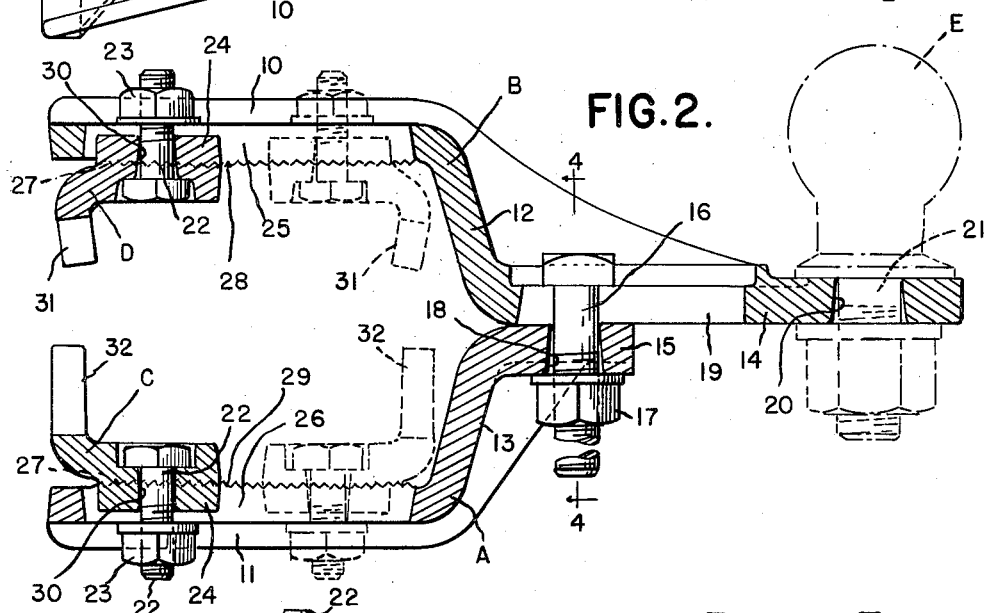
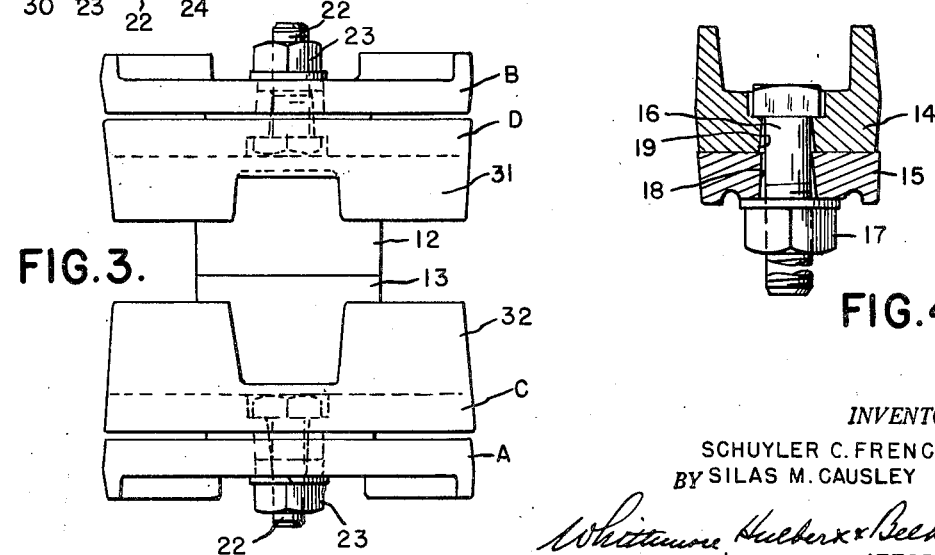
INVENTORS
SCHUYLER C. FRENCH
BY SILAS M. CAUSLEY
ATTORNEYS Patented July 25, 1950

2,516,459

UNITED STATES PATENT OFFICE 2,516,459

TRAILER HITCH

Schuyler C. French and Silas M. Causley,
Detroit, Mich.

Application August 25, 1947, Serial No. 770,442

8 Claims. (Cl. 280—33.44)

This invention relates generally to trailer hitches of the type employed for connecting or coupling a trailer or the like to a motor driven vehicle and refers more particularly to a hitch unit designed for attachment to the rear bumper or other suitable fixed portion of the motor driven vehicle.

One of the essential objects of the invention is to provide a hitch unit that may readily be attached to bumpers of various designs.

Another object is to provide a hitch unit having adjustable means for gripping positively and firmly the bumper or other part to the vehicle to which the hitch unit is applied, and that has suitable means which effectively prevent any accidental displacement of the hitch after it is attached.

Another object is to provide a hitch unit that is comparatively simple in construction, economical in manufacture, and extremely efficient in operation.

Other objects, advantages and novel details of construction of this invention will be made more apparent as this description proceeds, especially when considered in connection with the accompanying drawing, wherein:

Figure 1 is a top plan view of a hitch unit embodying our invention;

Figure 2 is a longitudinal vertical sectional view taken substantially on the line 2—2 of Figure 1, and showing by dotted lines a reversed position of the clamping element;

Figure 3 is an end elevation of the structure illustrated in Figure 1; and

Figure 4 is a transverse vertical sectional view taken substantially on the line 4—4 of Figure 2.

Referring now to the drawing, A is the lower arm, B is the upper arm, C is the lower clamping element, D is the upper clamping element, and E is a spherical element of the hitch unit embodying our invention.

As shown, the upper and lower arms B and A have straight horizontal portions 10 and 11 respectively that are disposed in spaced substantially parallel relation, and have inwardly extending inclined portions 12 and 13 respectively that terminate in laterally projecting substantially horizontal portions 14 and 15 respectively of different length. Preferably, the laterally projecting portions 14 and 15 are disposed in surface to surface relation with each other and are clamped by a suitable bolt 16 and nut 17. The lower laterally projecting portion 15 is relatively short and has a circular hole 18 receiving the bolt 16, while the upper laterally projecting portion 14 is relatively long and has a longitudinally elongated slot 19 receiving the bolt 16, whereby the lower arm A may be bodily adjusted lengthwise of the upper arm B. The upper laterally extending portion 14 is also provided adjacent its free end beyond the slot 19 with a circular opening 20 that receives a suitable mounting bolt 21 for the spherical element E.

The upper and lower clamping elements D and C are slidable lengthwise of the spaced parallel portions 10 and 11 of the arms and are adjustably connected thereto by suitable bolts 22 and nuts 23. Preferably, the clamping elements D and C have guide lugs 24 that are slidable in elongated slots 25 and 26, respectively extending lengthwise of the arms, and have serrated faces 27 that engage correspondingly serrated faces 28 and 29 respectively of the arms. The bolts 22 extend outwardly through circular holes 30 in the clamping elements and through the slots 25 and 26 in the arms, so that the clamping nuts 23 are accessible above and below said arms.

Preferably, the clamping elements D and C are substantially L-shaped in cross section and may be reversed as indicated by dotted lines in Figure 2, so that the clamping flanges 31 and 32 respectively thereof will be between the bolts 22 and the inclined portions 12 and 13 respectively of the arms. Thus this arrangement permits the clamping flanges 31 and 32 of the clamping elements to be adjusted quite close to the inclined portions 12 and 13 of the arms for clamping therebetween a relatively thin bumper or other portion of the vehicle to which the hitch unit is applied.

The spherical element E on the upper arm B is provided for coupling engagement with a socket or cup (not shown) of a suitable coupling member (not shown) on the trailer or other vehicle to be towed.

In use, a rear bumper or other fixed part of a vehicle (not shown) may be received between the parallel portions 10 and 11 of the arms and may be clamped between the flanges 31 and 32 of the clamping elements and the inclined portions 12 and 13 of said arms. To accomplish this, the clamping elements D and C are adjusted lengthwise of the arms B and A relative to the inclined portions 12 and 13 thereof. If necessary, the lower arm A may also be adjusted lengthwise of the upper arm B. Thus the slots 19, 25 and 26 respectively permit the desired adjustment of the parts to obtain the proper clamping action.

What we claim as our invention is:

1. A hitch unit having a pair of relatively slidable arms, one being provided with an element for coupling engagement with a coupling member on one vehicle, and means adjustable lengthwise of said arms for clamping a bumper or other part of a vehicle against one or more portions of said arms.

2. A hitch unit having a pair of relatively slidable arms, one being provided with an element for coupling engagement with a coupling member on one vehicle, and reversible clamping elements adjustable lengthwise of said arms and adapted to cooperate with portions of said arms to clamp a bumper or other part of another vehicle.

3. A hitch unit comprising a pair of connected arms having opposed portions, an element on one of said arms for coupling engagement with a coupling member on one vehicle, and means on said opposed portions adjustable lengthwise of said arms to clamp a bumper or other part of another vehicle against other portions of said arms.

4. A hitch unit comprising a pair of connected arms having opposed portions, one of said arms being adjustable lengthwise of the other, an element on the other of said arms for coupling engagement with a coupling member on one vehicle, and means on said opposed portions adjustable lengthwise of said arms to clamp a bumper or other part of another vehicle against other portions of said arms.

5. A hitch unit comprising a pair of connected arms having opposed portions, one of said arms being adjustable lengthwise of the other, an element on the other of said arms for coupling engagement with a coupling member on one vehicle, and clamping elements adjustable lengthwise of said opposed portions to clamp a bumper or other part of another vehicle against other portions of said arms.

6. A hitch unit having two separate arms, each having a substantially straight portion and an inwardly extending portion terminating in a laterally projecting portion, the straight portions of said arms being substantially parallel, the laterally extending portions being slidable relative to each other and being adjustably connected together, the laterally extending portion of one arm being longer than the laterally extending portion of the other arm, means on said longer portion for coupling engagement with a coupling member on one vehicle, and means between and carried by the straight parallel portions of said arms for clamping a part of another vehicle against the inwardly extending portions of said arms.

7. A hitch unit having two separate arms, each having a substantially straight portion and an inwardly extending portion terminating in a laterally projecting portion, the straight portions of said arms being substantially parallel, the laterally extending portions being slidable relative to each other and being adjustably connected together, means on one of said laterally extending portions for coupling engagement with a coupling member on one vehicle, and means carried by the straight parallel portions of said arms for clamping a part of another vehicle against the inwardly extending portions of said arms.

8. A hitch unit having two separate arms, each having a substantially straight portion and an inwardly extending portion terminating in a laterally projecting portion, the straight portions of said arms being substantially parallel, the laterally extending portions being slidable relative to each other and being adjustably connected together, a spherical element on one of said laterally extending portions for coupling engagement with a coupling member on one vehicle, and clamping elements adjustable lengthwise of the straight parallel portions of said arms for clamping a part of another vehicle against the inwardly extending portions of said arms.

SCHUYLER C. FRENCH.
SILAS M. CAUSLEY.

REFERENCES CITED

The following references are of record in the file of this patent:

UNITED STATES PATENTS

| Number | Name | Date |
| --- | --- | --- |
| 1,304,787 | Macneal | May 27, 1919 |
| 1,974,628 | Presley | Sept. 25, 1934 |
| 2,120,422 | Williams et al. | June 14, 1938 |
| 2,306,007 | Thorp | Dec. 22, 1942 |